(12) United States Patent
Hirano et al.

(10) Patent No.: US 6,987,917 B2
(45) Date of Patent: Jan. 17, 2006

(54) OPTICAL FIBER PREFORM PRODUCING METHOD, OPTICAL FIBER PREFORM, AND OPTICAL FIBER

(75) Inventors: Masaaki Hirano, Kanagawa (JP); Masashi Onishi, Kanagawa (JP); Hideyuki Ijiri, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 220 days.

(21) Appl. No.: 10/312,911

(22) PCT Filed: Dec. 7, 2001

(86) PCT No.: PCT/JP01/10728

§ 371 (c)(1),
(2), (4) Date: Jan. 3, 2003

(87) PCT Pub. No.: WO02/49974

PCT Pub. Date: Jun. 27, 2002

(65) Prior Publication Data

US 2003/0103748 A1    Jun. 5, 2003

(51) Int. Cl.
*G02B 6/18*    (2006.01)
*C03B 37/025*    (2006.01)

(52) U.S. Cl. .................. 385/124; 385/123; 65/428; 65/435

(58) Field of Classification Search ............... 385/123, 385/124; 65/427, 428, 435
See application file for complete search history.

(56) References Cited

U.S. PATENT DOCUMENTS 4,820,322 A * 4/1989 Baumgart et al. ............ 65/412

6,053,013 A * 4/2000 Oh et al. ....................... 65/412
6,128,927 A * 10/2000 Ahrens et al. ................. 65/392
6,584,808 B1 * 7/2003 Roba et al. .................... 65/412

FOREIGN PATENT DOCUMENTS

| EP | 58036940 | | 3/1983 |
| EP | 62176934 | | 8/1987 |
| EP | 0 244 135 A1 | * | 11/1987 |
| EP | 1 209 497 A2 | | 5/2002 |
| GB | 2 314 077 A | | 12/1997 |
| JP | 51-142338 | | 12/1976 |
| JP | 54-13351 | | 1/1979 |
| JP | 54-13351 A | | 1/1979 |
| JP | 57-118042 | | 7/1982 |
| JP | 2000-264669 | | 9/2000 |
| JP | 2001-10837 A | | 1/2001 |
| WO | WO 99/09437 | * | 2/1999 |
| WO | WO 00/26150 | | 5/2000 |

* cited by examiner

*Primary Examiner*—John D. Lee
(74) *Attorney, Agent, or Firm*—McDermott Will & Emery LLP

(57) ABSTRACT

An object of the present invention is to provide a method for manufacturing an optical fiber preform having a great diameter by reducing an eccentricity or a non-circularity of a core, an optical fiber preform having an small non-circularity and a complex refractive index profile, even with a great diameter, and an optical fiber that is applicable as a dispersion compensating fiber. The present invention involves a rod-in collapse process in which a glass rod is fixed within a glass pipe (or a dummy pipe attached to an end portion) via an aligning jig. The fixation via the aligning jig is made at one end or both ends, the aligning jig has a cylindrical shape with or without one or more reduced diameter portions. When fixed at one end, a heating and integrating process is preferably made from an opposite end. Employing the glass rod and the glass pipe having a refractive index distribution, a complex profile can be realized.

16 Claims, 11 Drawing Sheets

GLASS PIPE 2
GLASS ROD 1
DUMMY PIPE 3a
FUSION FIXATION 5b
5a REDUCED DIAMETER PORTION
3b DUMMY PIPE

OPTICAL FIBER PREFORM PRODUCING METHOD, OPTICAL FIBER PREFORM, AND OPTICAL FIBER

TECHNICAL FIELD

The present invention relates to a method for manufacturing an optical fiber preform by rod-in collapse method and an optical fiber.

BACKGROUND ART

As a method for manufacturing an optical fiber preform, a rod-in collapse method is well-known. This rod-in collapse method involves forming a glass having at least a core portion into a rod shape, forming the glass for a cladding into a glass pipe having a great thickness, inserting the rod into the glass pipe, and melting the rod and the glass pipe in a state where the pressure within the glass pipe is set to be lower than outside the glass pipe, while heating, to produce an optical fiber preform having the core and the cladding. Using a produced collapsed body as a preform intermediate product, a cladding portion may be composed around its outer circumferential portion to make a large preform by vapor phase deposition such as VAD method and OVD method, or a rod-in collapse method.

Figure 15A:
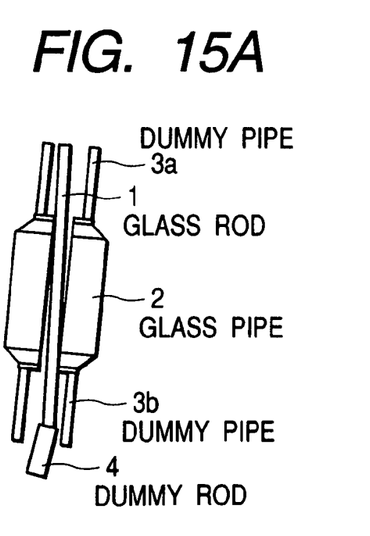
FIG. 15A is a cross-sectional view of the glass rod disposed with the glass pipe.
Figure 15B:
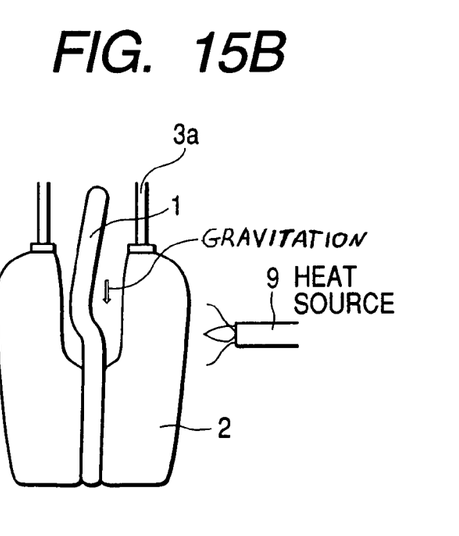
FIG. 15B is a cross-sectional view of the same glass rod on the course of collapse.

With this method, dummy pipes 3a, 3b are connected with a glass pipe 2 for forming the cladding, as shown in FIG. 15A. The glass pipe 2 is set near a not-shown heat source of a resistance furnace, a high frequency furnace, or an oxy-hydrogen flame, etc., for performing the collapse so that the central axis may be vertical (vertical type). An inner surface of the glass pipe 2 is etched to smooth it and remove impurities. Then, a glass rod 1 having at least a core portion (hereinafter simply abbreviated as a glass rod) is pushed up by a dummy rod 4 and inserted into the glass pipe 2. The glass pipe 2 with the glass rod 1 inserted is baked in a chlorine gas atmosphere and dried, and the impurities are removed. Then, the glass pipe 2 is collapsed from an upper or lower portion to produce the optical fiber preform. With this method, the glass pipe 2 may be possibly collapsed in a state where the glass rod 1 is inclined, as shown in FIG. 15A. A portion softened by heating is deformed under the gravity, as shown in FIG. 15B, whereby there is a problem of causing the core of the produced optical fiber preform to be eccentric and deformed.

Figure 16A:
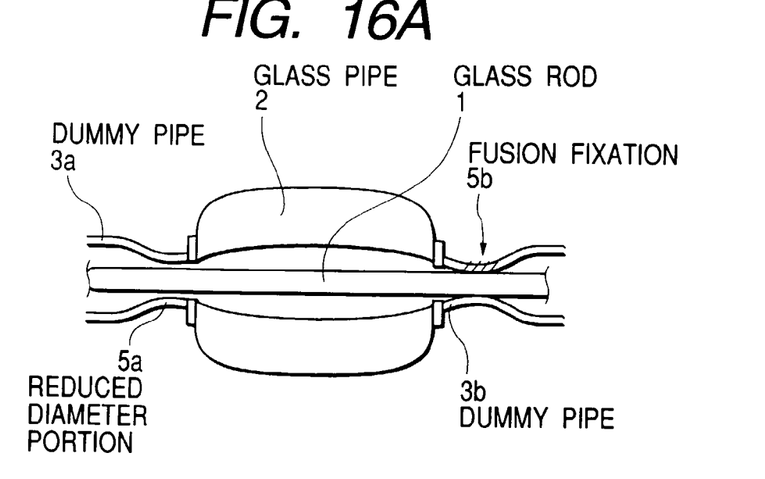
FIG. 16A is a cross-sectional view of the glass rod disposed with the glass pipe.
Figure 16B:
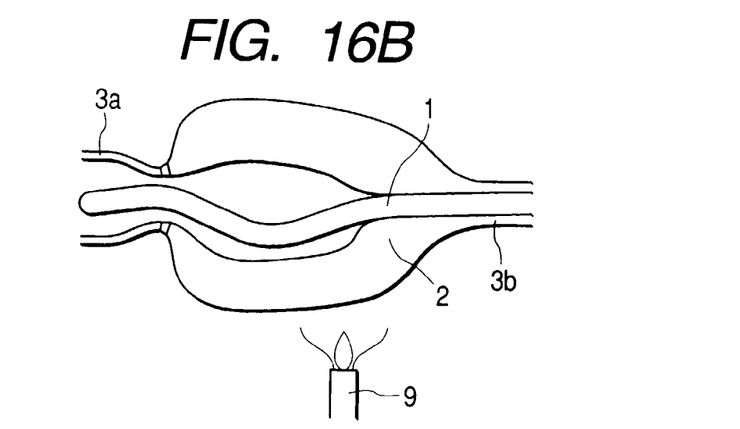
FIG. 16B is a cross-sectional view of the same glass rod on the course of collapse.

When the glass rod 1 is placed in a horizontal direction (horizontal type) as shown in FIG. 16A, the dummy pipes 3a, 3b are connected to both ends of the glass pipe 2 by the conventional method, a reduced diameter portion 5a, 5b being formed in a part of the dummy pipe 3a, 3b. Then, the glass rod 1 is inserted into the glass pipe 2 and the dummy pipes 3a, 3b as shown in figure, fused and fixed with the reduced diameter portion 5b of one dummy pipe 3b, and collapsed from the side of the dummy pipe 3a that is opposite to the fixed side. In this case, the heating amount is increased, especially when the outer diameter of the glass pipe 2 is 45 mm$\phi$ or more. If the glass rod 1 is softened by heating, the glass rod 1 is moved so that a heated portion is deformed, as shown in FIG. 16B. Therefore, the produced optical fiber preform has the same problem as with the vertical type.

In recent years, a dispersion compensating fiber has been developed for compensating a chromatic dispersion that occurs in making the optical communication in a wavelength band of 1.55 $\mu$m, employing one of the optical fibers having a zero dispersion in a wavelength band of 1.3 $\mu$m. Since a zero dispersion fiber for 1.3 $\mu$m wavelength band causes a great positive chromatic dispersion in a wavelength band of 1.55 $\mu$m, the dispersion compensating fiber is required to have a great negative chromatic dispersion that is inverse to the positive chromatic dispersion in the wavelength band of 1.55 $\mu$m to compensate this chromatic dispersion.

Therefore, the dispersion compensating fiber has a structure that a relative refractive index difference $\Delta$ between the core and the cladding is increased (usually about 0.35% for a single mode fiber most typical for 1.3 $\mu$m transmission and about 1.0 to 3.0% for the dispersion compensating fiber) by the addition of dopant, and the core diameter is reduced (usually about 8 to 10 $\mu$m for the single mode fiber and about 2 to 6 $\mu$m for the dispersion compensating fiber).

The dispersion compensating fiber is likely to cause a polarization mode dispersion (PMD) because the core of high refractive index is employed, and is likely to be elliptical because the glass of the core portion has a lower viscosity due to influence of $GeO_2$ doped into the core. A non-circularity of the core is represented by the numerical formula 1, when regarding the core as substantially elliptical, in which the core is more round for the smaller non-circularity.

(Numerical Formula 1)

Non-circularity=(length of major axis–length of minor axis)/length of major axis×100(%)

PMD is increased in proportion to the non-circularity of the core. It is known that especially when the relative refractive index difference $\Delta$ is higher, the non-circularity of the core has more effect on degradation of PMD. Accordingly, the dispersion compensating fiber with high relative refractive index difference $\Delta$ is required to have a small non-circularity.

The dispersion compensating fiber is required, for example, to have the polarization mode dispersion characteristics excellent for a WDM transmission system (system for transmitting a large amount of information corresponding to multiple times the conventional information by inputting a plurality of signal having different wavelengths) having 10 Gb/s (gigabits/second) per wave or more, and to prevent the non-circularity of the core.

However, in the dispersion compensating fiber of the described structure, the glass rod containing a large amount of dopant is likely to be deformed due to heating, when the rod-in collapse is made. If the thickness of the glass pipe is increased to produce a large optical fiber preform, a large amount of heat is needed in a heating/integrating process by the conventional collapse method, deforming the core into elliptical shape to make the non-circularity worse, resulting in a problem that it is difficult to obtain the excellent polarization mode dispersion characteristics. When the glass pipe of large diameter was employed to produce the large preform by the rod-in collapse method, this problem was more remarkable.

In view of the above-mentioned problems, it is an object of the present invention to provide a method for manufacturing an optical fiber that is rounder than by the conventional method, by reducing the non-circularity of core with the rod-in collapse method, an optical fiber preform with a reduced non-circularity, and an optical fiber.

SUMMARY OF THE INVENTION

The present invention can solve the above-mentioned problems by employing the following constitution (1) to (16).

(1) A method for manufacturing an optical fiber preform, including at least a rod-in collapse process for inserting a glass rod into a glass pipe and heating and integrating them, wherein the rod-in collapse process is made by fixing the glass rod via an aligning jig that is fixed within the glass pipe or a dummy glass pipe connected to an end portion of the glass pipe.

(2) The method for manufacturing the optical fiber preform according to (1), wherein the aligning jig has a fixing portion and an aligning portion.

(3) The method for manufacturing the optical fiber preform according to (1), wherein the central axis of the glass pipe is kept in a vertical direction in the heating and integrating.

(4) The method for manufacturing the optical fiber preform according to (1), wherein the viscosity coefficient of the glass rod inserted is smaller than that of the glass pipe at a temperature of the heating and integrating.

(5) The method for manufacturing the optical fiber preform according to (1), wherein the aligning jig is fixed within the glass pipe, the glass rod is inserted into the glass pipe, and the glass rod is fixed with the aligning jig.

(6) The method for manufacturing the optical fiber preform according to (1), wherein the glass pipe, the aligning jig and the glass rod are heated and integrated while being rotated.

(7) The method for manufacturing the optical fiber preform according to (1), wherein the heating and integrating is started from near an end portion of the glass rod opposite to the side where the glass rod is fixed, and heated and integrated toward a fixed end.

(8) The method for manufacturing the optical fiber preform according to (3), wherein a fixed end of the glass pipe is disposed on the upper side, and a start end of heating and integrating is disposed on the lower side.

(9) The method for manufacturing the optical fiber preform according to (1), wherein a gap between the glass rod and the glass pipe immediately before heating and integrating is from 0.1 mm to 3 mm.

(10) The method for manufacturing the optical fiber preform according to (1), wherein the glass rod has a refractive index distribution.

(11) The method for manufacturing the optical fiber preform according to (1), wherein the glass pipe has a refractive index distribution.

(12) The method for manufacturing the optical fiber preform according to (1), further including a process for forming a glass layer on the outside of the glass rod produced through the rod-in collapse process to produce an optical fiber preform.

(13) An optical fiber preform that is produced by the method for manufacturing the optical fiber preform according to.

(14) An optical fiber preform according to (13), wherein the core non-circularity is 1.5% or less.

(15) An optical fiber that is produced by drawing, as preform, the optical fiber preform according to (13) or the glass rod produced from the optical fiber preform according to (13) as an intermediate product.

(16) The optical fiber according to (15) wherein PMD is 0.15 ps (picosecond)/$\sqrt{km}$ or less.

BRIEF DESCRIPTION OF THE DRAWINGS

FIGS. 4A and 4B are cross-sectional views showing a rod-in collapse process according to an embodiment of the invention, in which

FIGS. 5A to 5C are cross-sectional views showing the problems of the invention when no fixation is made, in which

FIGS. 7A and 7B show still another embodiment of the invention, in which

FIGS. 8A and 8B are schematic explanatory views showing another embodiment of the aligning jig of the invention, in which

FIGS. 9A to 9C are schematic explanatory views showing still another embodiment of the invention, in which

FIGS. 11A and 11B show the profile of refractive index for the glass used in an example 4 of the invention, in which

FIGS. 12A and 12B show the profile of refractive index for the glass used in an example 5 of the invention, in which

FIGS. 15A and 15B are views for outlining the conventional method (vertical type disposition), in which

FIGS. 16A and 16B are views for outlining the conventional method (horizontal type disposition), in which

FIGS. 17A and 17B are views for explaining how the glass rod is eccentric with high non-circularity when the core rod and the glass pipe are misaligned with respect to the central axis, in which

In these figures, reference numeral 1 denotes a glass rod, 2 denotes a glass pipe, 3, 3a and 3b denote a dummy pipe, 4 denotes a dummy rod, 5a and 5b denote a reduced diameter portion of the dummy pipe, 6 denotes an aligning jig, 6a and 6c denote a cylinder portion, 6b denotes a reduced diameter portion, 7 denotes an aligning jig, 7a and 7c denote a cylinder portion, 7b denotes a reduced diameter portion, 8 denotes a support rod, 9 and 10 denote a heat source, 11 denotes an aligning jig, 11a, 11c and 11d denote a cylinder portion, 11b1 denotes a reduced diameter portion (fixing portion), 11b2 denotes a reduced diameter portion (aligning portion), 12 denotes an aligning jig, 13 denotes an aligning jig, 13a and 13c denote a cylinder portion, 13b denotes a reduced diameter portion, and 14 denotes an aligning jig.

BEST MODE FOR CARRYING OUT THE INVENTION

The present invention provides a method for manufacturing an optical fiber preform having a small core non-circularity and an optical fiber with less degraded PMD characteristics, in which the glass rod is prevented from being deformed or becoming elliptical at the time of heating by fusing and fixing the glass rod with a dummy pipe via an aligning jig having an aligning function so that the glass rod containing a core may not be moved by elongation or melting due to heating in making a rod-in collapse, even if the glass pipe has a great thickness or diameter.

Figure 1:
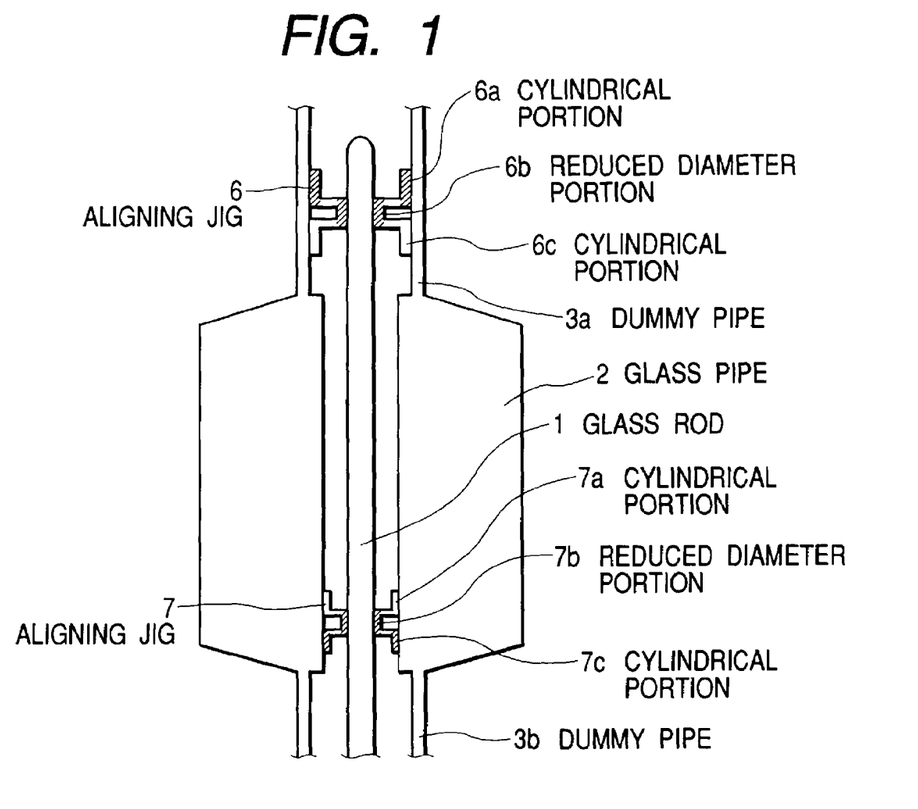
FIG. 1 is a cross-sectional view showing one embodiment of the present invention.

Referring to FIG. 1, this invention will be specifically described below. In FIG. 1, the same parts are designated by the same numerals in FIGS. 15 and 16, and description of those parts is omitted.

First of all, a core rod or a glass rod 1 having at least a core (hereinafter generically referred to as a glass rod) and a glass pipe 2 for forming a cladding, which are subjected to a rod-in collapse method, are prepared by well-known techniques.

For example, a porous preform for the core based on silica glass that is synthesized by the VAD method to have a predetermined glass composition, refractive index or refractive index distribution, is dehydrated and vitrified, and then subjected to a elongation process to produce the glass rod having a predetermined outer diameter. As a pretreatment for the rod-in collapse process, a process for polishing the outer periphery of the glass rod to make the glass rod completely round, or washing and cleaning a surface layer by HF may be made.

The glass pipe 2 is produced by synthesizing the porous preform made of silica glass or silica glass with a refractive index modifier doped by the VAD method or OVD method, a sol-gel method, or a method for forming glass particles, sintering or vitrifying it, and working it into a pipe shape. The dummy pipes 3a and 3b connected to the glass pipe 2 are also prepared by well-known techniques. Though not employed in FIG. 1, the dummy rod connected to the glass rod 1 is also prepared.

Figure 2:
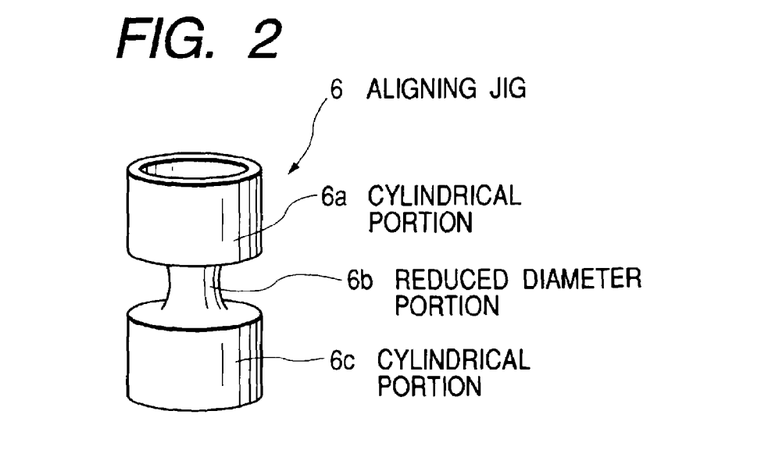
FIG. 2 is a perspective view showing one embodiment of an aligning jig of the invention.

FIG. 2 is a perspective view showing one example of an aligning jig of the invention. The aligning jig 6 of this example is shaped like a cylinder that can be inserted into the glass pipe and/or dummy pipe in the outer diameter, and can insert at least an end portion of the glass rod in the inner diameter, the cylinder having reduced outer diameter at its almost central portion. In the middle between an upper cylinder portion 6a and a lower cylinder portion 6c, the cylinder has a reduced diameter portion 6b having an inner diameter that is slightly larger than the outer diameter of the glass rod (with a clearance through which the glass rod can be inserted before fusion) and an outer diameter that is reduced from that of each cylindrical portion 6a, 6c. The material of the aligning jig 6 is preferably silica based glass for the fusion fixation with the glass rod and the glass pipe.

The rod-in collapse process of this invention is performed in the following way. ① The glass pipe 2 having the dummy pipes 3a and 3b connected to the upper and lower ends is prepared. ② The aligning jig 6 cylindrically shaped with a central portion by providing the reduced diameter portions 6b as shown in FIG. 1 is inserted into one end of the glass pipe 2, and the dummy pipe 3a or 3b. ③ The glass rod 1 prepared separately is inserted into the glass pipe 2 and/or the aligning jig 6. ④ The aligning jig 7 provided at the opposite end is inserted into the glass pipe 2 and the dummy pipe 3a or 3b. ⑤ The aligning jig 6, 7 is fixed with the dummy rod 3a, 3b or the glass pipe 2. ⑥ The glass rod 1 is fixed with the aligning jig. The fixing means may be by heating fusion using an external heating source, not shown, in FIG. 1. In FIG. 1, an upper end portion of the glass rod 1 is fixed via the aligning jig 6 with the dummy pipe 3, and a lower end portion of the glass rod 1 is fixed via the aligning jig 7 with the glass pipe 2. In FIG. 1, it is meant that a portion indicated by the slanting line is fixed. The same is true in FIGS. 2 to 9.

Figure 17A:
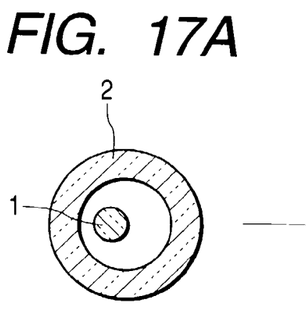
FIG. 17A is a cross-sectional view before collapse.
Figure 17B:
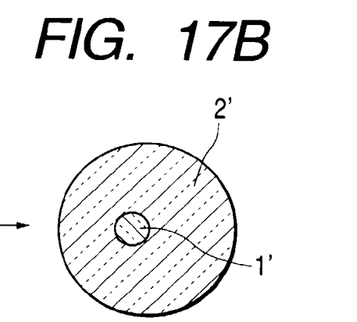
FIG. 17B is a cross-sectional view after collapse.

At this time, it is preferable that the glass rod 1 and the glass pipe 2 are aligned as precisely as possible so that their central axes may be almost matched, to prevent the glass rod 1 from being eccentric or elliptical. If their central axes are unmatched, there are produced a largely worked portion (with a large gap between the glass rod 1 and the glass pipe 2) and a small worked portion (with a small gap between the glass rod 1 and the glass pipe 2), as shown in FIG. 17A. Therefore, a glass body (collapsed body) collapsed has a circumferential cross-section in which the core is so eccentric as to have a high non-circularity, as shown in FIG. 17B.

After that, the glass rod 1 and the glass pipe 2 are heated and integrated by heating means such as the flame, an electric furnace, or a high frequency plasma to produce a collapsed body that is not eccentric and has reduced non-circularity. A temperature distribution of the heating means is desirably uniform in a circumferential direction of the glass rod 1 and the glass pipe 2. For this purpose, the glass rod 1 and the glass pipe 2 (comprising the dummy pipe) is preferably rotated at the time of heating. If the temperature distribution is not uniform in the circumferential direction, the glass rod is eccentric and has a large non-circularity.

Figure 3:
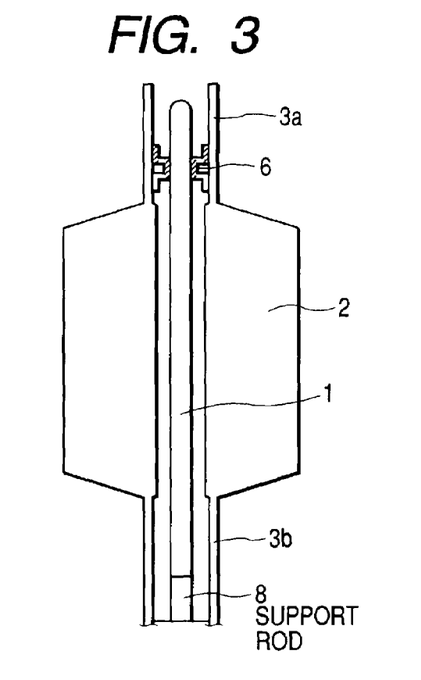
FIG. 3 is a cross-sectional view showing another embodiment of the invention.

In FIG. 1, the glass rod 1 and the glass pipe are fused and fixed at both ends via the aligning jigs 6 and 7. However, in this invention, the glass rod 1 and the glass pipe 2 may be fused and fixed at at least one end via the aligning jig. As shown in FIG. 3, the glass rod 1 and the glass pipe 2 are fixed only at one end in such a manner that they are fused and fixed via the aligning jig 6 at an upper end in the same manner as in FIG. 1, and a support rod 8 is provided under the glass rod 1 at a lower end as a strut.

Figure 4A:
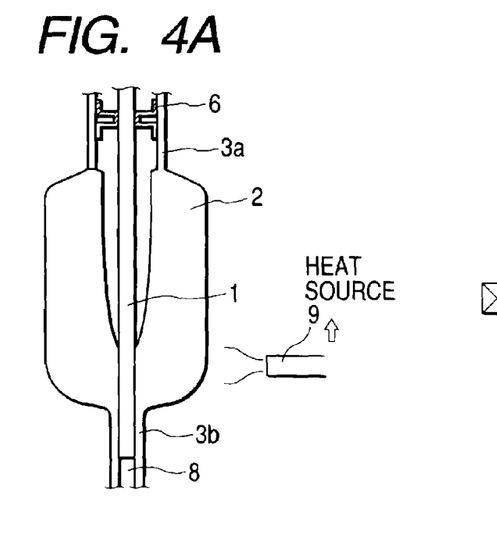
FIG. 4A is a cross-sectional view showing the rod-in collapse process in which a heat source is moved.

When the glass rod 1 and the glass pipe 2 are fixed only at one end, the glass pipe 2 starts to be collapsed from an opposite end of a fixed end, and is collapsed toward the fixed end by moving the glass pipe 2 and the glass rod 1 or the heat source 9, as shown in FIG. 4A. Thereby, it is possible to attain the same effect as in the previous case where both the ends are fused and fixed.

Figure 4B:
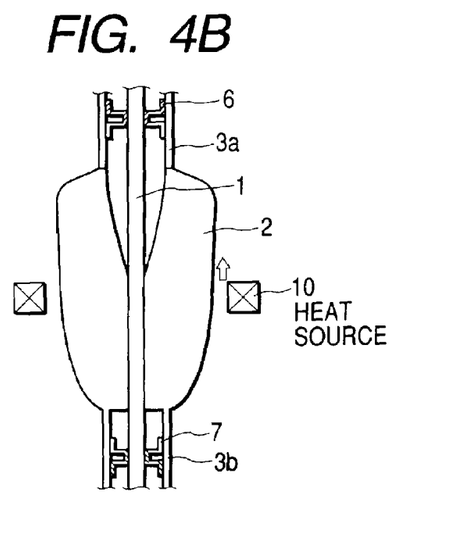
FIG. 4B is a cross-sectional view showing the rod-in collapse process in which a glass body is moved.
Figure 5A:
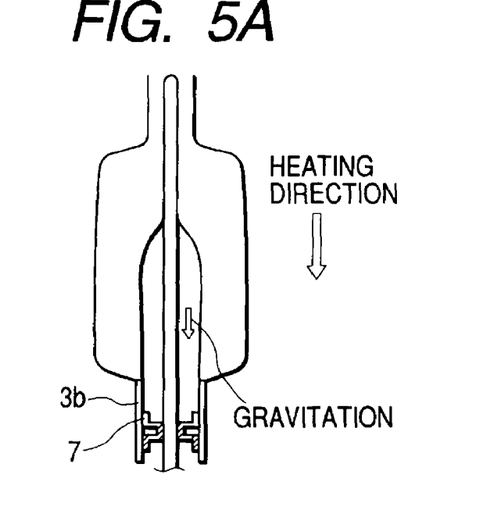
FIGS. 5A and 5B show a state on the course of collapse.
Figure 5B:
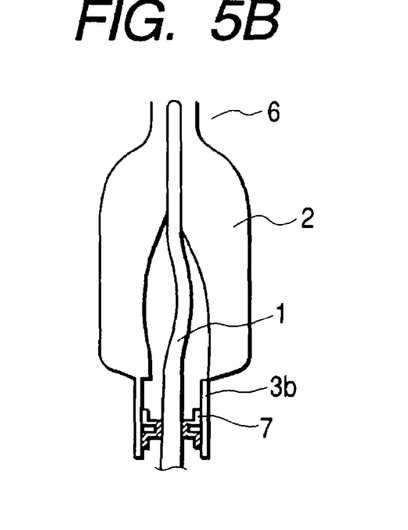
Figure 5C:
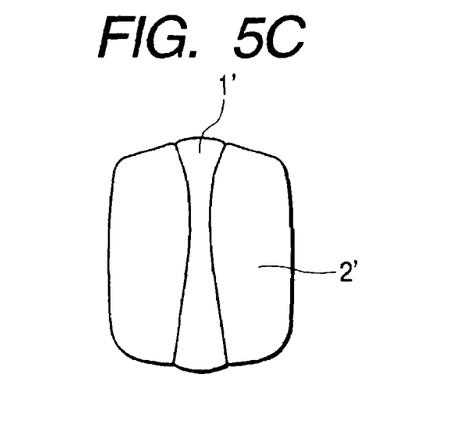
FIG. 5C shows a state after collapse.

Whether fusion fixation is at both ends or only one end, in the case of a vertical type (vertical disposition), it is preferable to collapse the glass pipe 2 from the lower to upper direction, as shown in FIGS. 4A and 4B. If the glass pipe 2 is collapsed from the upper to lower direction, a gravity is exerted on a heating portion to stretch the glass rod 1, as shown in FIG. 5A. However, since the glass rod 1 is fixed at the opposite end, the glass rod 1 is bent as shown in FIG. 5B. If the glass rod is not fixed, the ratio of the outer diameter of the glass rod 1' after collapse to the outer diameter of the glass pipe 2' after collapse is not constant in a longitudinal direction, due to elongation, as shown in FIG. 5C.

On one hand, if the glass rod is fused and fixed at the upper end, and collapsed from the lower to upper direction, as shown in FIGS. 4A and 4B, a collapsed portion is immediately under a heating area, so that no elongation occurs and the core non-circularity is small.

Figure 6:
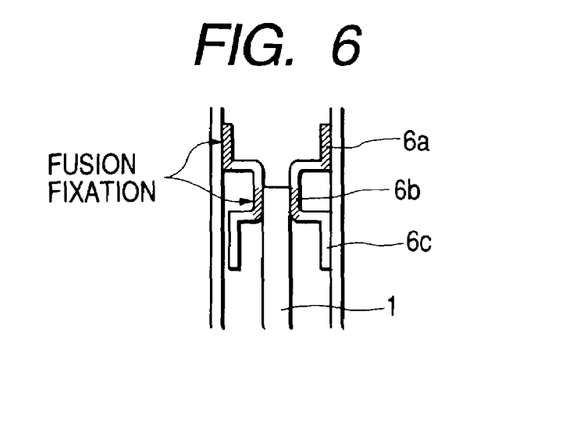
FIG. 6 is a cross-sectional view showing still another embodiment of the invention.

In the above description, the glass rod is fused and fixed by reaching the cylindrical portion 6a of the aligning jig. However, the glass rod may be fused and fixed by disposing an end portion of the glass rod at a position of the reduced diameter portion 6c, as shown in FIG. 6.

Figure 7A:
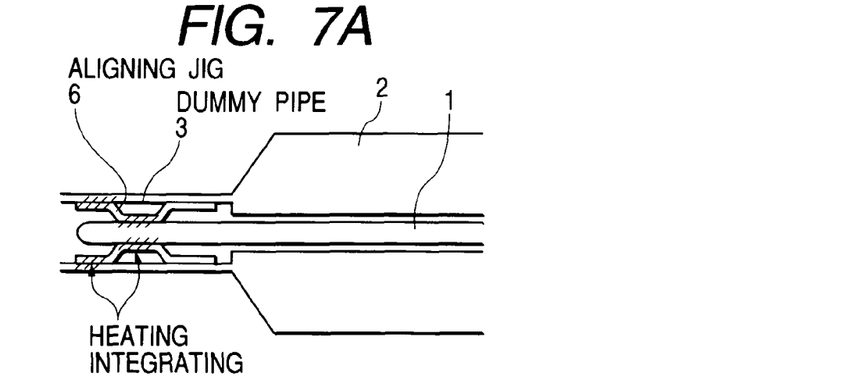
FIG. 7A is a cross-sectional view of the aligning jig with one reduced diameter portion.

In the example of this invention as shown in FIG. 1, the aligning jig 6 has one reduced diameter portion. In this case, if the glass rod is bent due to heating for fusing the aligning jig and the glass rod together, the central axes of the glass rod and the glass pipe are deviated, irrespective of the use of the aligning jig, as shown in FIG. 7A. This problem will possibly occur especially when the viscosity of the glass rod is low.

Figure 7B:
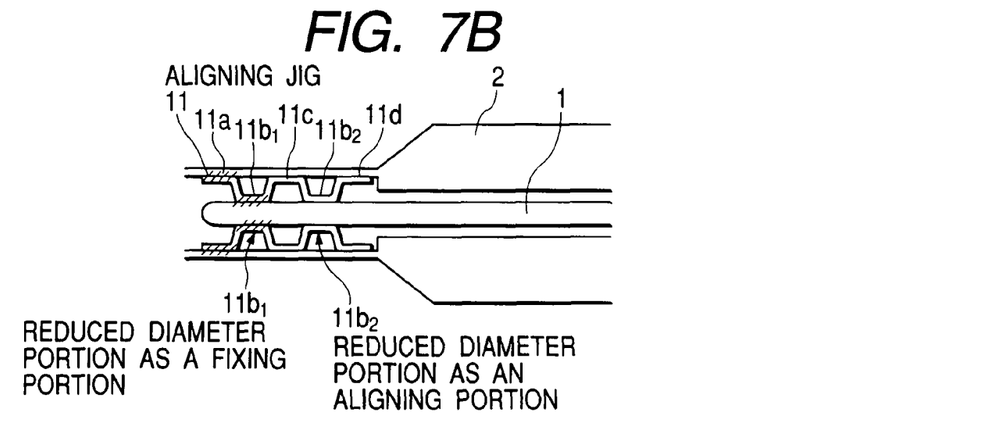
FIG. 7B is a cross-sectional view of the aligning jig with two reduced diameter portions.

As means for avoiding the above risk, two or more reduced diameter portions 11b of the aligning jig 11 may be provided, in which the glass rod is fused and fixed with the reduced diameter portion 11b1 at the outermost end, as shown in FIG. 7B. This means is very suitable because even if the glass rod is deformed in the reduced diameter portion 11b1 at the outermost end used as a fixing portion, the next reduced diameter portion 11b2 as an aligning portion plays a role of aligning, so that the central axes of the glass rod and the glass pipe are not deviated.

Figure 8A:
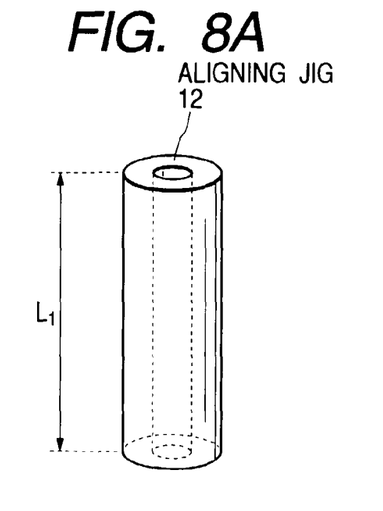
FIG. 8A is a perspective view and FIG. 8B is a cross-sectional view.
Figure 8B:
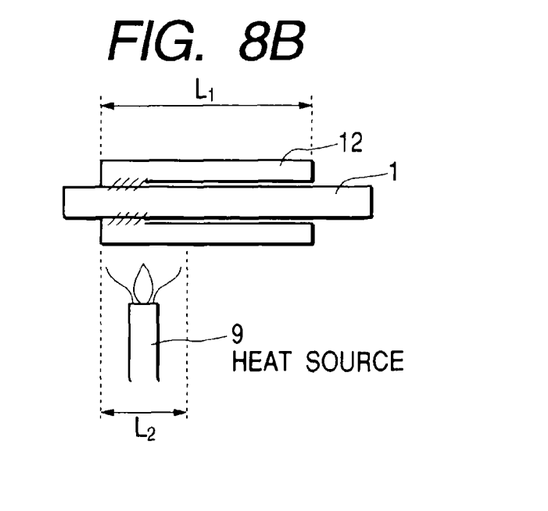

The aligning jig of the invention may take an arbitrary form as long as it is interposed between the glass pipe (and/or the dummy pipe) and the glass rod to fuse and fix them. In the above description, the aligning jig has a cylindrical configuration with one or more reduced diameter portions. However, the aligning jig may be a simple cylindrical shape, in which the glass rod is fused and fixed at one end or both ends, as shown in FIG. 8A. Assuming that the length of a cylindrical aligning jig 12 in the central axis direction is L1 in FIG. 8, if the aligning jig 12 in which the length L1 is sufficiently longer than the length L2 of a heat zone for the heat source in heating integrating, as shown in FIG. 8B, a portion that is not heated (unheated portion) acts as the aligning portion to provide the favorable result.

Figure 9A:
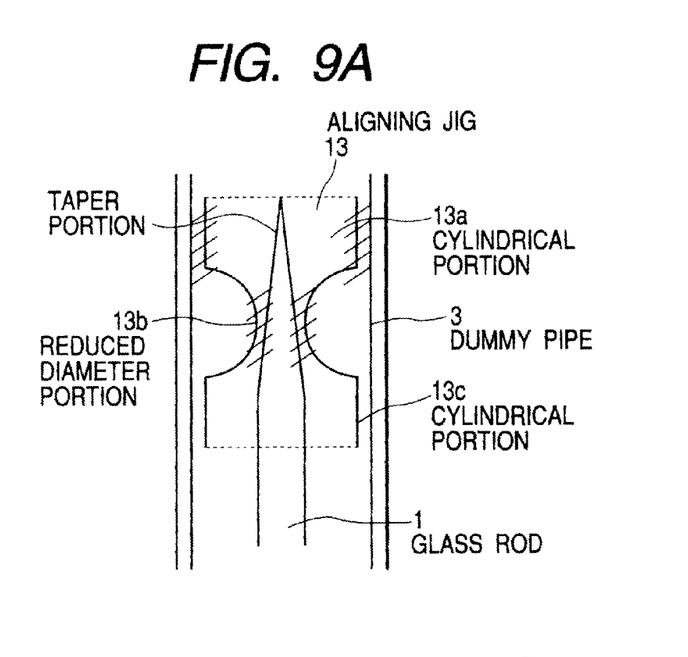
FIG. 9A is a cross-sectional view of a taper portion of the glass rod fused and fixed with the aligning jig.
Figures 9B, 9C:
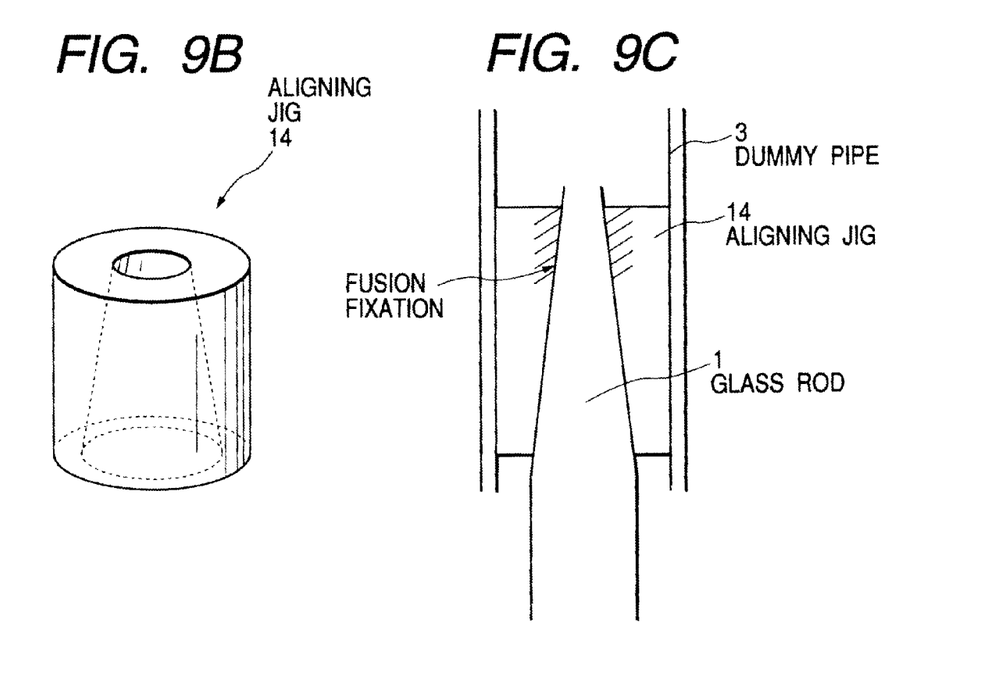
FIG. 9B is a perspective view of the aligning jig.
FIG. 9C is a cross-sectional view of the taper portion of the glass rod inserted into the aligning jig and fused and fixed therewith.

FIG. 9 shows an example of fusing and fixing the glass pipe with the aligning jig in the case where the glass rod has a taper portion at the end portion in this invention. FIG. 9A shows the example in which the taper portion of the glass rod 1 is fused and fixed with the reduced diameter portion 13b of the aligning jig 13, and the aligning jig is fused and fixed with the dummy pipe 3 in the cylindrical portion 13a. FIG. 9B is a perspective view of an aligning jig 14 having a cylindrical outer shape and a taper portion on an inner wall face. As shown in FIG. 9C, the aligning jig 14 is inserted through the glass rod 1 with the taper, with a portion as indicated by the slanting line fused and fixed with the glass rod 1.

These aligning jigs 13 and 14 may be provided at only one end or both the ends, and fixed at one side or both sides, as already described.

The core of the collapsed body produced in accordance with the inventive method in the above manner has a lower non-circularity or is closer to a true circle than the core collapsed without fixation by the conventional method, as specifically shown in an example 1 as will be described later.

It is particularly preferable that the collapsed body of the invention has a non-circularity of 1.5% or less. The optical fiber produced from this collapsed body has very small PMD, as described below.

Figure 13:
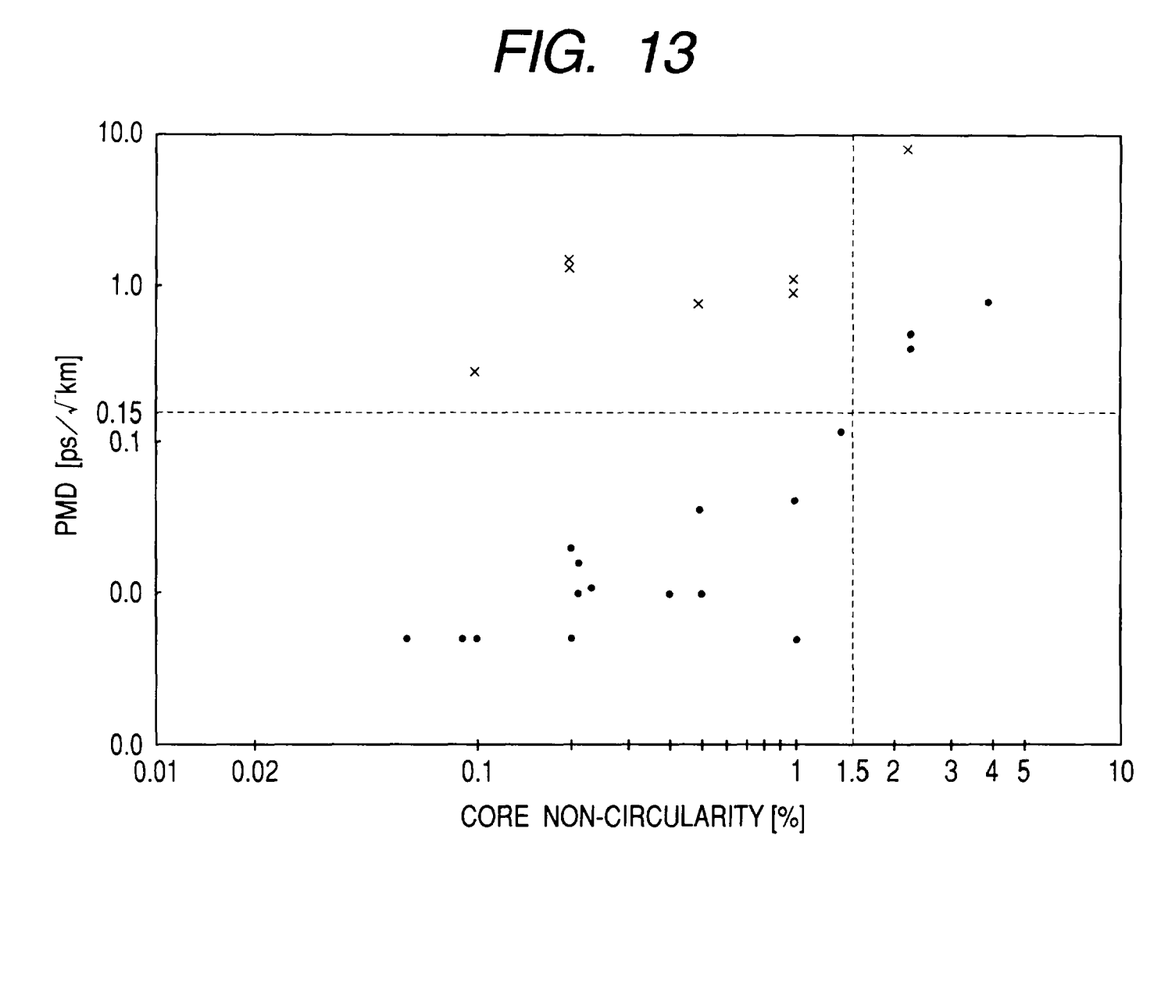
FIG. 13 is a graphical representation showing the relationship between the non-circularity of core and PDM in the optical fiber.
Figure 14:
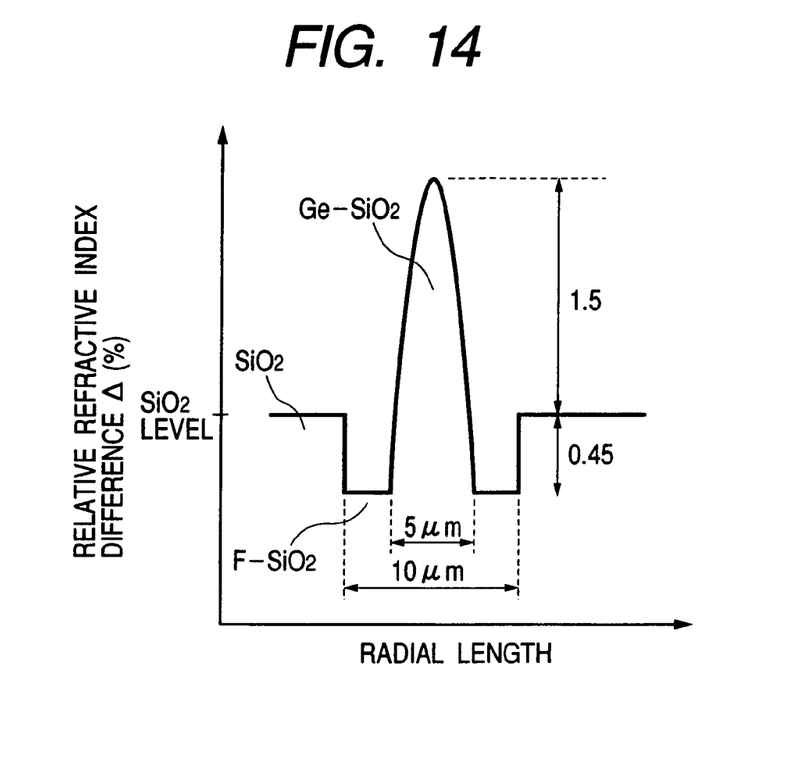
FIG. 14 is a graphical representation showing the profile of refractive index in each optical fiber of FIG. 13.

FIG. 13 is a graphical representation showing the relationship between the core non-circularity (%) and PMD ($ps/\sqrt{km}$) as obtained from the experiments by the inventors. As shown in FIG. 14, a glass preform was composed of a central core portion of $GeO_2$—$SiO_2$, a first cladding of F—$SiO_2$, and a second cladding of $SiO_2$, in which the relative refractive index difference Δ of the central core with respect to the second cladding was 1.5%, and the relative refractive index difference $Δ^-$ of the first cladding was 0.45%. This glass preform was drawn, and had a central core diameter of 5 μm, a first cladding diameter of 10.5 μm, and the characteristics at a wavelength of 1550 nm, including a chromatic dispersion of −47 ps/km/nm, a dispersion slope of −0.08 $ps/km/nm^2$, Aeff (effective area) of 20 $μm^2$, a cut-off wavelength of 750 nm, a transmission loss of 0.27 dB/km. Thereby, a variety of optical fibers having a core non-circularity in a range from about 0.04 to 4% were produce. The relationship between the core non-circularity (%) and PMD ($ps/\sqrt{km}$) for each produced optical fiber is shown in FIG. 13. In FIG. 13, a sign ● denotes an optical fiber that is drawn with oscillation as disclosed in JP-A-6-171970 and JP-A-9-243833, and a sign x denotes an optical fiber that is drawn without oscillation. As shown in FIG. 13, PMD is 0.15 $pd/\sqrt{km}$ or less suitable for high-capacity transmission, when the non-circularity is 1.5% or less. Also, the optical fiber with oscillation is a smaller PMD than without oscillation.

Herein, the drawing with oscillation is a drawing method in which the optical fiber is twisted at a certain degree by guiding it using a guide roller having a rotation shaft oscillated periodically at the time of drawing, whereby polarized modes are coupled by forcefully twisting a glass softened portion at the time of drawing. Then, the broadening of an input pulse due to polarization mode dispersion is obtained in accordance with a numerical formula 2, as compared with the case where polarized modes are scarcely coupled without oscillation (Numerical formula 2)

$(4Lh)^{-1/2}$ times where L is the length of optical fiber (m), and h is the number of revolutions per meter of fiber length (1/m). Accordingly, the PMD is smaller for greater h.

The rod-in collapse method of this invention may be utilized as a process for producing an optical fiber preform intermediate product, and other processes may rely on the well-known techniques in the technical fields to produce the optical fiber intermediate product and the optical fiber preform (preform), which is then drawn to obtain the optical fiber.

That is, the collapsed body of this invention maybe used directly as the optical fiber preform, and drawn as a drawing preform by the well-known method to produce the optical fiber, or the collapsed body is further jacketed by the well-known sooting method, rod-in collapse method, or sol-gel method to obtain the drawing preform and produce the optical fiber. In the latter case, a glass body produced by collapsing is employed as the preform intermediate product, in which the ratio (2a/2D) of the core diameter (outer diameter 2a) to the cladding diameter (outer diameter 2D) for the intermediate product is greater than the design value, and is equalized to the design value by jacketing. With this method, the large preform with low non-circularity can be obtained.

The method for drawing the optical fiber of this invention may rely on the well-known means, but if the drawing with oscillation is performed, the optical fiber can have very small PMD.

In the inventive method, the glass composition of the glass rod and the glass pipe is not limited at all, but the glass rod and/or glass pipe may have a refractive index distribution. Thereby, the optical fiber preform having a complex refractive index profile and the optical fiber can be produced.

Also, the inventive method is effective for the rod-in collapse method for the combination of the glass rod and the glass pipe in any size.

When the outer diameter of the glass pipe is greater than 45 mmφ, the amount of heating for collapsing is increased, in which through the core is likely to deform by the conventional collapse method, this invention can be applied to suppress the core from being eccentric or deformed, resulting in reduced non-circularity and very significant effect.

In collapsing the glass pipe having great thickness, because a heated portion is arcuately deformed in the horizontal disposition, the glass pipe is preferably in the vertical disposition.

For example, in a case where the glass pipe to be worked has a great viscosity coefficient and the glass rod that must not be deformed has a small viscosity coefficient, such that the glass pipe is made of pure $SiO_2$, and the glass rod is made of a combination of $F$—$SiO_2$ or $GeO_2$—$SiO_2$, the glass rod is more likely to deform by the conventional method without fixation, and the core non-circularity is subject to degradation. In this case, the inventive method can be applied very effectively.

EXAMPLES

The present invention will be specifically described below by way of example, but is not limited to the given examples.

Example 1 and Comparative Example 2

Using a glass pipe (made of pure $SiO_2$) having an outer diameter of 70 mmφ and an inner diameter of 15.1 to 22 mmφ as listed in Table 1, and a glass rod (made of $SiO_2$, F additive concentration of 0.9 mol %) having an outer diameter of 15 mmφ, the glass pipe was collapsed under the conditions as listed in Table 1. No. 1 to No. 12 involved the aligning jig and the fixing method as shown in FIG. 7B, and No. 13 involved the aligning jig and the fixing method as shown in FIG. 7A, in which the heating source was an electric furnace. The surface highest temperature of the glass at the time of collapse was 1550° C. (measured by a pyroscope), and the exhaust pressure was 5 kPa. The length of a heat zone where the surface temperature was in a range from 1500 to 1550° C. was 60 mm. In Table 1, fixation present means that the glass rod is fused and fixed at both ends or one end in this invention. No. 1, 3, and 5 to 12 are examples of this invention, and No. 2 and 4 are comparative examples. The core non-circularity of the produced collapsed body was measured. The results are listed in Table 1.

TABLE 1

| No. | Disposition of pipe and rod | Inner diameter of pipe (φ mm) | Gap between pipe and rod (mm) | Fixation | Number of revolutions (rpm) | Direction of collapse | Distribution of core non-circularity (%) | Number of voids (number/100 mm) |
|---|---|---|---|---|---|---|---|---|
| 1 | Horizontal | 17 | 1.0 | Present | 10 | — | 1.0–2.0 | 0 |
| 2 | Horizontal | 17 | 1.0 | None | 10 | — | 2.5–4.0 | 0 |
| 3 | Vertical | 17 | 1.0 | Present | 10 | Lower → upper | 0.05–0.5 | 0 |
| 4 | Vertical | 17 | 1.0 | None | 10 | Lower → upper | 1.6–4.0 | 0 |
| 5 | Vertical | 17 | 1.0 | Present | 10 | Upper → lower | 1.0–2.0 | 0 |
| 6 | Vertical | 17 | 1.0 | Present | 0 | Lower → upper | 0.8–1.8 | 0 |
| 7 | Vertical | 20 | 2.5 | Present | 10 | Lower → upper | 0.2–0.9 | 0 |
| 8 | Vertical | 21 | 3.0 | Present | 10 | Lower → upper | 0.5–1.4 | 0 |
| 9 | Vertical | 22 | 3.5 | Present | 10 | Lower → upper | 0.7–1.7 | 0 |
| 10 | Vertical | 16 | 0.5 | Present | 10 | Lower → upper | 0.05–0.4 | 0 |
| 11 | Vertical | 15.2 | 0.1 | Present | 10 | Lower → upper | 0.05–0.3 | 0 |
| 12 | Vertical | 15.1 | 0.05 | Present | 10 | Lower → upper | 0.05–0.3 | 5 |
| 13 | Vertical | 17 | 1.0 | Present | 10 | Lower → upper | 1.0–2.0 | 0 |

Glass pipe: $SiO_2$, outer diameter of 70 mmφ

Glass rod: 0.9 mol %, F additive $SiO_2$, outer diameter of 15 mmφ

Glass surface temperature at the time of collapse: 1500° C., exhaust pressure: 5 kPa No. 1 to 12 were collapsed by a jig constituted as in FIG. 7B.

No. 13 was collapsed by a jig constituted as in FIG. 7A.

As will be clear from the results of Table 1, it is favorable to reduce the core non-circularity that the glass pipe is fixed at at least an upper end and collapsed from the lower to upper direction while the glass pipe and the glass rod are being rotated.

Also, it will be found that the clearance between the glass rod and the glass pipe before starting the collapse is from 0.1 mm to 3 mm to obtain the excellent results. Though the core non-circularity is reduced with the smaller clearance, the experiments conducted by the present inventors revealed that the glass pipe was collapsed, with a gap left on the interface between the glass rod and the glass pipe for the clearance below 0.1 mm, unfavorably giving rise to voids. Also, if the clearance was too small, the glass rod was contacted with an inner surface of the glass pipe and likely to cause a damage at the time of inserting the glass rod. This damage also gives rise to voids.

On one hand, if the clearance is above 3 mm, the core non-circularity exceeds 1.5%.

Example 2

1) A glass rod made of $SiO_2$ with 25 mol % of $GeO_2$ added and having an outer diameter of 7 mm$\phi$ and a glass pipe made of almost pure silica and having an outer diameter of 70 mm$\phi$ and an inner diameter of 8 mm$\phi$ were produced by the VAD method. The glass pipe had an inner surface smoothed by vapor etching, and had an inner diameter of 8 mm$\phi$.

2) The glass rod was inserted into the glass pipe, and fixed at an upper end of the glass pipe via an aligning jig of FIG. 7B, and collapsed under the conditions that the glass surface temperature was 1880° C., the exhaust pressure was 5 kPa, the number of revolutions was 10 rpm, employing an electric furnace as a power source, from a start end that is at the lower end, thereby producing an optical fiber preform intermediate product having a diameter of 69.8 mm$\phi$. The non-circularity of this intermediate product was measured and excellently 0.5%.

3) After measuring a refractive index profile of the produced intermediate product, a jacket layer of pure $SiO_2$ having an outer diameter multiplied by 3.1 was formed over the intermediate product by the well-known VAD method to produce an optical fiber preform (preform).

4) The produced optical fiber preform was drawn by the well-known oscillation drawing method to produce an optical fiber. The characteristics of the optical fiber were measured and found very excellent such that, at a wavelength of 1550 nm, the PMD was 0.08 ps/$\sqrt{km}$, the transmission loss was 0.33 dB/km, the chromatic dispersion was –76 ps/km/nm, the dispersion slope was +0.10 ps/km/nm$^2$, Aeff was 16 $\mu m^2$, $\lambda c$(2m) was 770 nm, and the bending loss at a diameter of 20 mm$\phi$ was 0.01 dB/m.

Example 3

Figure 10:
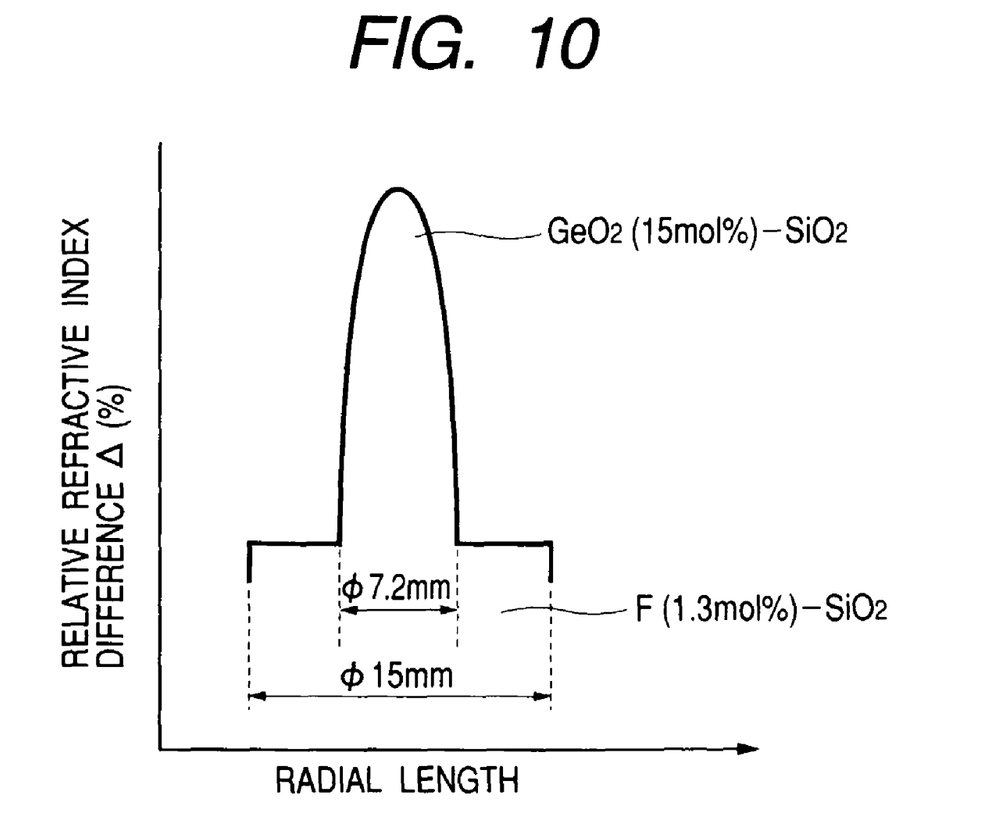
FIG. 10 is a graphical representation showing the profile of refractive index for a core rod used in an example 3 of the invention.

A glass rod having an outer diameter of 15 mm$\phi$, composed of a central portion (diameter of 7.2 mm$\phi$) made of silica glass with $GeO_2$ added by 15 mol % at maximum and an outer circumferential portion made of silica glass with 1.3 mol % of F added, was produced, as shown in FIG. 10. This glass rod composed of the central portion as glass rod and the F added portion as glass pipe was prepared in accordance with the collapse method of the invention.

The rod may be produced by the VAD method in the following manner. First of all, a porous glass preform is produced by the VAD method so that the outer circumferential portion of the core in the porous glass preform may contain a high concentration of $GeO_2$. The preform is heated to harden the outer circumferential portion to the extent that fluorine as dopant may not permeate in a next process. The preform is heated in a fluorine containing atmosphere, and fluorine is added to a cladding portion of the preform. In this manner, fluorine can be selectively added to only the cladding portion of the preform. Also, using the fluorine (F) added portion as the glass pipe, the central portion containing $GeO_2$ may be formed inside by the CVD method.

Separately, a pipe made of pure $SiO_2$ having an outer diameter of 70 mm$\phi$ and an inner diameter of 17 mm$\phi$ was prepared, and the produced glass rod was inserted into the pipe. Then, the produced pipe was collapsed from a lower end, with an upper end fixed by the aligning jig of FIG. 7B as in the example 2. The collapse conditions were such that the temperature was 1860° C., the exhaust pressure was 4 kPa, and the number of revolutions was 10 rpm. After the end of collapse, a 3.5 times jacket layer made of pure $SiO_2$ was formed to produce an optical fiber preform in the same manner as in the example 2.

The produced optical fiber preform was drawn by the well-known oscillation drawing method to produce an optical fiber. The characteristics of this optical fiber were measured such that at a wavelength of 1550 nm, the PMD was 0.05 ps/$\sqrt{km}$, the transmission loss was 0.26 dB/km, the chromatic dispersion was –49.4 ps/km/nm, the dispersion slope was –0.08 ps/km/nm$^2$, Aeff was 19 $\mu m^2$, $\lambda c$(2 m) was 790 nm, and the bending loss at a diameter of 20 mm$\phi$ was 0.3 dB/m, whereby a chromatic dispersion and dispersion slope compensating fiber was produced.

Example 4

Figure 11A:
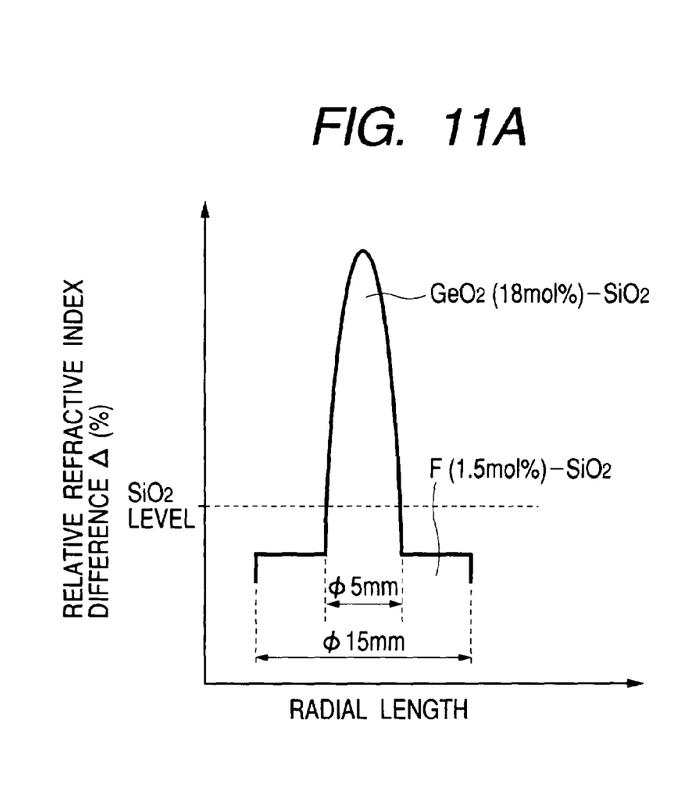
FIG. 11A is a graphical representation showing the profile of refractive index for a glass rod.
Figure 11B:
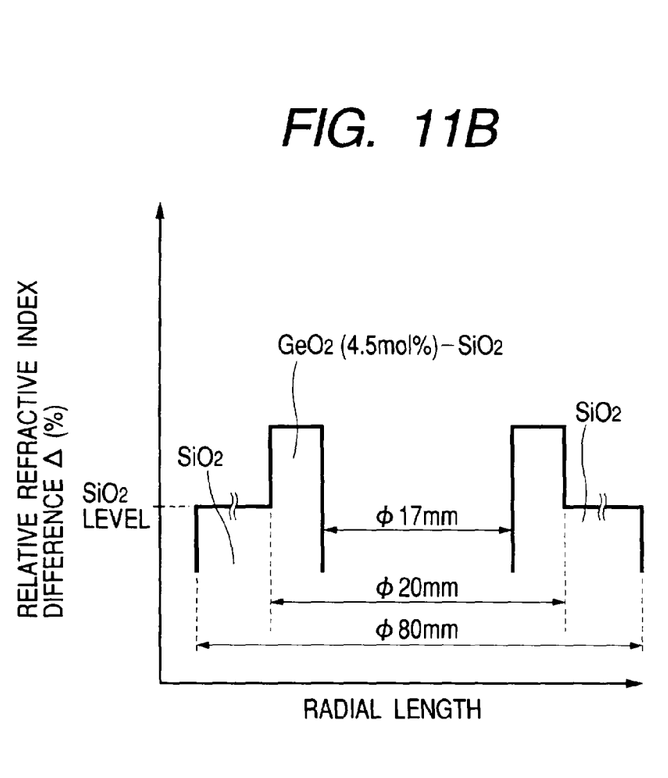
FIG. 11B is a graphical representation showing the profile of refractive index for a glass pipe.

A glass rod having an outer diameter of 15 mm and a structure of FIG. 11A was prepared in the same manner as in the example 2. Also, a glass pipe made of $SiO_2$ with 4.5 mol % of $GeO_2$ added and having an outer diameter of 80 mm$\phi$ was prepared separately, in which the glass pipe had a two-layer structure composed of an inner layer portion having an inner diameter of 17 mm$\phi$ and an outer diameter of 20 mm$\phi$ and an outer layer portion made of pure $SiO_2$ laid around the outer circumference of the inner layer portion, as shown in FIG. 11B. Though the well-known VAD method was employed in this example, this structure may be made by synthesizing a glass body having a desired refractive index distribution by the OVD method, and opening a central portion, or by a method for depositing a glass having a composition of $GeO_2$—$SiO_2$ inside the pipe made of pure silica by the CVD method.

The glass rod and the glass pipe were collapsed with an upper end of the glass pipe fixed by the aligning jig of FIG. 7B in the same manner as in the example 2. The conditions were such that the surface temperature was 1840° C., the exhaust pressure was 6 kPa, and the number of revolutions was 10 rpm. Thereby, a preform intermediate product having an outer diameter of 79.6 mm$\phi$ was produced. The core non-circularity of this intermediate product was 0.4%.

After measuring the core non-circularity, the preform was drawn into a fiber by the well-known oscillation drawing method. The characteristics of this produced optical fiber were measured such that at a wavelength of 1550 nm, the PMD was 0.07 ps/$\sqrt{km}$, the transmission loss was 0.35 dB/km, the chromatic dispersion was –102 ps/km/nm, the dispersion slope was –1.0 ps/km/nm Aeff was 10 $\mu m$, $\lambda c$(2 m) was 1450 nm, and the bending loss at a diameter of 20 mm$\phi$ was 18 dB/m, whereby a chromatic dispersion and dispersion slope compensating fiber was produced.

Example 5

A glass rod made of silica with 1.5 mol % of fluorine (F) added and having an outer diameter of 5 mm$\phi$ was prepared. Also, a glass pipe made of $SiO_2$ with 10 mol % of $GeO_2$ added and having an outer diameter of 100 mm$\phi$ was prepared separately, in which the glass pipe had a two-layer structure composed of an inner layer portion having an inner diameter of 7 mm$\phi$ and an outer diameter of 12 mm$\phi$ and an outer layer portion made of pure $SiO_2$ laid around the outer circumference of the inner layer portion, in the same manner as in the example 3. Though the well-known VAD method was employed in this example, this structure may be made by synthesizing a glass body having a desired refractive index distribution by the OVD method, and opening a central portion, or by a method for depositing a glass having a composition of $GeO_2$—$SiO_2$ inside the pipe made of pure silica by the CVD method.

Figure 12A:
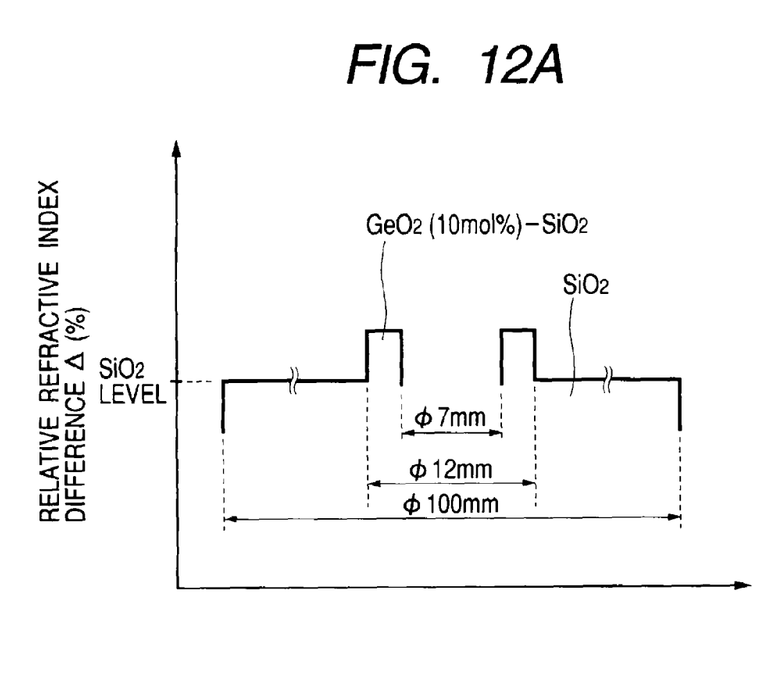
FIG. 12A is a graphical representation showing the profile of refractive index for the glass pipe.
Figure 12B:
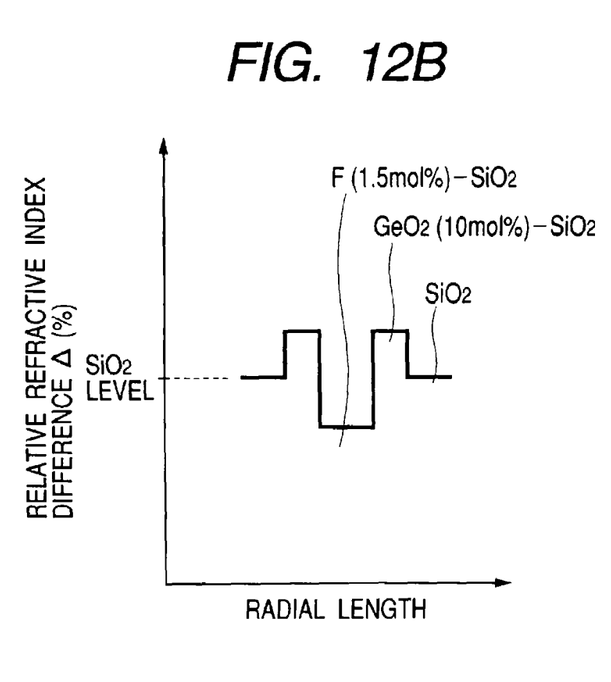
FIG. 12B is a graphical representation showing the profile of refractive index for the glass rod.

The glass rod and the glass pipe were collapsed with an upper end of the glass pipe fixed by the aligning jig of FIG. 7B in the same manner as in the example 2. The conditions were such that the surface temperature was 1920° C., the exhaust pressure was 3 kPa, and the number of revolutions was 10 rpm. Thereby, a preform intermediate product having an outer diameter of 99.6 mmφ was produced. The core non-circularity of this intermediate product was 0.6%. After examining the non-circularity, the preform was drawn into a fiber by the well-known oscillation drawing method. The characteristics of this produced optical fiber were measure such that at a wavelength of 1550 nm, the PMD was 0.10 ps/√km, the transmission loss was 0.23 dB/km, the chromatic dispersion was −2.5 ps/km/nm, the dispersion slope was +0.07 ps/km/nm$^2$, Aeff was 80 μm$^2$, λc(2 m) was 1100 nm, and the bending loss at a diameter of 20 mmφ was 2 dB/m, whereby a ring core type dispersion shift fiber of FIG. 12B was produced.

In the above examples, the method for manufacturing the glass rod and the glass pipe was the VAD method or a combination of the VAD method and the rod-in collapse method. However, the same glass rod and glass pipe may be produced by the OVD method or sol-gel method whereby the same effects can be achieved as in the above examples.

Though this invention has been described above in detail in connection with the specific embodiments, it will be apparent to those skilled in the art various variations or modifications may be made thereto without departing from the scope or spirit of the invention.

This application is based on JP-A-2000-374081 dated on Dec. 08, 2000, its contents being incorporated into this specification by reference.

INDUSTRIAL APPLICABILITY

As above described, with this invention, the optical fiber preform and the optical fiber can be produced having the less eccentric or deformed core and being nearly round (having the reduced non-circularity and being excellent). Also, using the glass rod and the glass pipe having a refractive index distribution, the optical fiber preform having a complex profile can be produced with the small core non-circularity. And due to the lower core non-circularity of the optical fiber preform, if the preform is drawn into a fiber, the optical fiber with low PMD is produced. In this manner, the optical fiber with low PMD does not distort the transmission signal and is very favorable.

What is claimed is:

1. A method for manufacturing an optical fiber preform, including at least a rod-in collapse process for inserting a glass rod into a glass pipe and heating and integrating them, characterized in that said rod-in collapse process is made by fixing said glass rod via an aligning jig that is fixed within said glass pipe or a dummy glass pipe connected to an end portion of said glass pipe.

2. The method for manufacturing the optical fiber preform according to claim 1, characterized in that said aligning jig has a fixing portion and optionally an aligning portion spaced apart from said fixing portion.

3. The method for manufacturing the optical fiber preform according to claim 1, characterized in that a central axis of said glass pipe is kept in a vertical direction in said heating and integrating.

4. The method for manufacturing the optical fiber preform according to claim 1, characterized in that a viscosity coefficient of said glass rod inserted is smaller than that of said glass pipe at a temperature of said heating and integrating.

5. The method for manufacturing the optical fiber preform according to claim 1, characterized in that said aligning jig is fixed within said glass pipe, said glass rod is inserted into said glass pipe, and said glass rod is fixed with said aligning jig.

6. The method for manufacturing the optical fiber preform according to claim 1, characterized in that said glass pipe, said aligning jig and said glass rod are heated and integrated while being rotated.

7. The method for manufacturing the optical fiber preform according to claim 1, characterized in that said heating and integrating is started from near an end portion of said glass rod opposite to the side where said glass rod is fixed, and heated and integrated toward a fixed end.

8. The method for manufacturing the optical fiber preform according to claim 1, characterized in that a fixed end of said glass pipe is disposed on the upper side, and a start end of heating and integrating is disposed on the lower side.

9. The method for manufacturing the optical fiber preform according to claim 1, characterized in that a gap between said glass rod and said glass pipe immediately before heating and integrating is from 0.1 mm to 3 mm.

10. The method for manufacturing the optical fiber preform according to claim 1, characterized in that said glass rod has a refractive index distribution.

11. The method for manufacturing the optical fiber preform according to claim 1, characterized in that said glass pipe has a refractive index distribution.

12. The method for manufacturing the optical fiber preform according to claim 1, characterized by further including a process for forming a glass layer on an outside of said glass rod produced through said rod-in collapse process to produce an optical fiber preform.

13. An optical fiber preform characterized in that it is produced by the method for manufacturing the optical fiber preform according to claim 1.

14. An optical fiber preform according to claim 13 characterized in that a core non-circularity is 1.5% or less.

15. An optical fiber characterized in that it is produced by drawing, as preform, the optical fiber preform according to claim 13 or the glass rod produced from the optical fiber preform according to claim 13 as an intermediate product.

16. The optical fiber according to claim 15, characterized in that PMD is 0.15 ps/√km or less.

* * * * *